Figure 2:
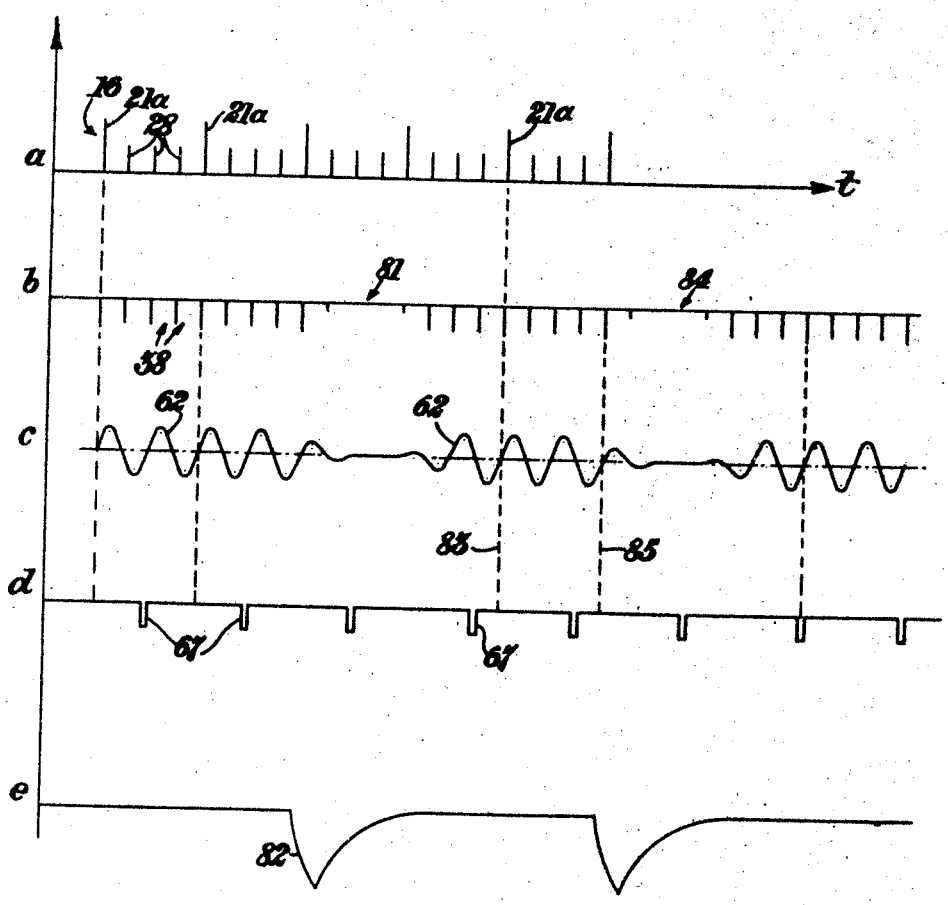

Fig. 1.

April 1, 1947.  L. A. DE ROSA  2,418,112
SYNCHRONIZING SYSTEM
Filed Feb. 13, 1943  2 Sheets-Sheet 2

INVENTOR.
LOUIS A. DE ROSA
BY
Percy P. Lantzy
ATTORNEY

Patented Apr. 1, 1947

2,418,112

UNITED STATES PATENT OFFICE 2,418,112

SYNCHRONIZING SYSTEM

Louis A. de Rosa, Staten Island, N. Y., assignor to Federal Telephone and Radio Corporation, Newark, N. J., a corporation of Delaware Application February 13, 1943, Serial No. 475,733

14 Claims. (Cl. 172—293)

This invention relates to synchronizing systems and more particularly to the synchronizing of devices in both time and space/or angular phase relation.

It is a relatively simple matter to synchronize the speed of two rotating devices located at points remote to each other. It is a more difficult problem to synchronize satisfactorily the two devices in a given space or angular phase relationship. Further, should two such devices operating in a given angular phase relation drop out of phase it usually requires an operator's attention to re-synchronize the devices.

It is an object of my invention to provide a synchronizing system which is capable of bringing a second rotatable device up to the speed of a first rotating device and to automatically synchronize the second device in a given angular phase relation with the first device.

Another object of the invention is to provide an energy control for a synchronizing system using pilot and synchronizing pulses, wherein the control permits flow of energy during coincidence of the pilot and synchronizing pulses and prevents flow when the pilot and synchronizing pulses are not in substantial coincidence.

The above and additional objects of the invention will become more apparent upon a further consideration of the following detailed description to be read in connection with the accompanying drawings, in which:

Figure 1:
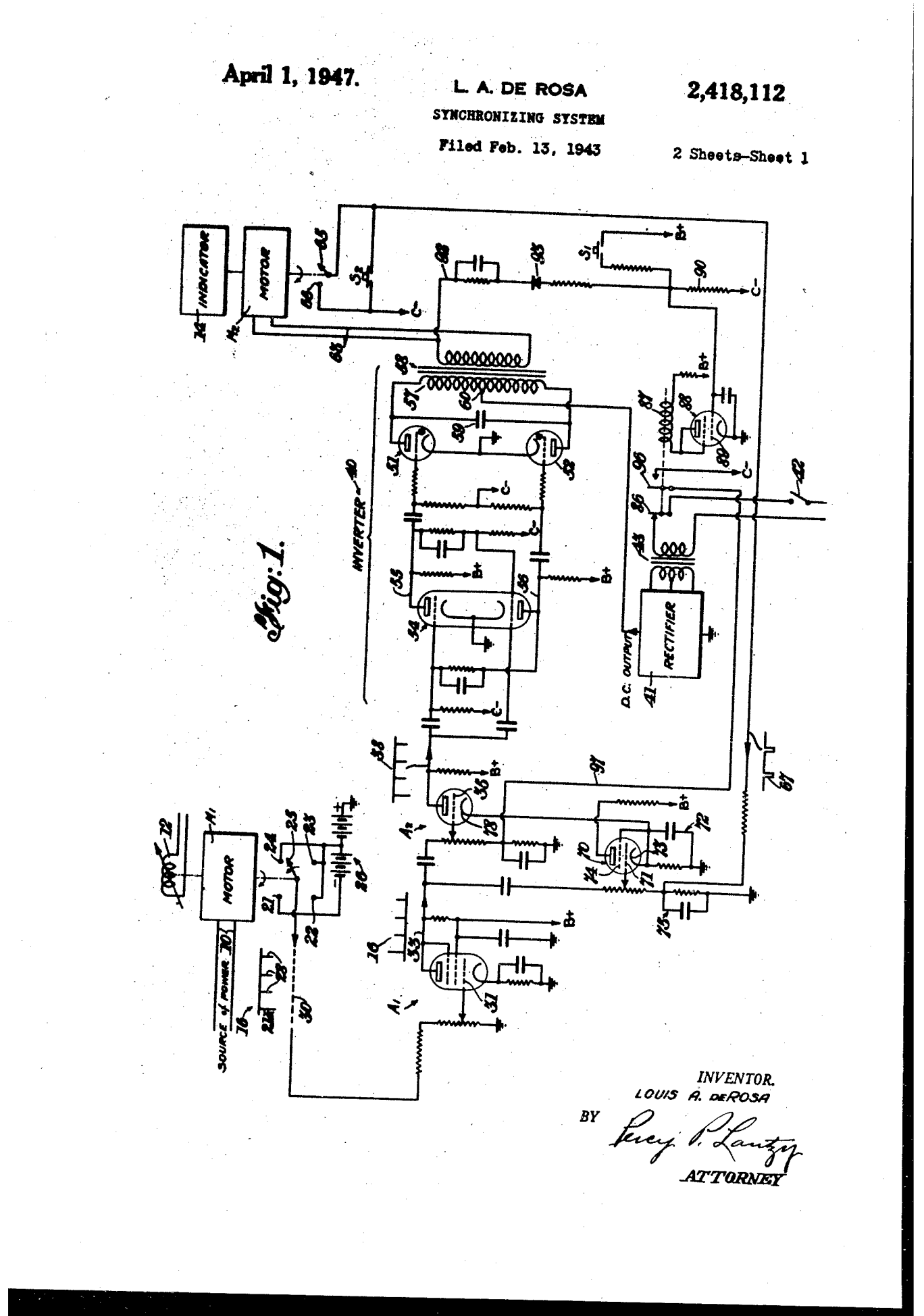

Fig. 1 is a schematic illustration of a synchronizing system in accordance with my invention, and Fig. 2 is a graphical illustration of the operating steps thereof.

Referring to Figs. 1 and 2, the system is shown to include a first motor $M_1$ and a second motor $M_2$. The motor $M_1$ is supplied with a source of power 10 to drive a first device such as a radio goniometer 12 at a given speed. The motor $M_2$ is driven in synchronism with the motor $M_1$ by means to be described later, and controls the position of an indicator 14 the operation of which is to be maintained in a given angular phase relation with respect to the radio goniometer 12. In order to establish and maintain this synchronous relationship, I provide the motor $M_1$ with means to produce a series of pulses 16 for each rotation of the motor. This series of pulses 16 may be produced by any suitable means.

One form of pulse generating means, for example, may comprise a plurality of stationary contacts 21, 22, 23 and 24 associated with a movable contact 25 driven by the motor $M_1$. The rotation of the contact 25 produces a series of four pulses for each rotation of the motor. The contact 21 is connected to the negative side of a battery 26 to produce a pilot pulse 21a. The contacts 22, 23 and 24 are connected to the battery 26 but at a different potential from the contact 21 so that the pulses 28 produced thereby are of less strength than the pilot pulse 21a. While I have shown a simple circuit for producing four pulses per rotation, it will be understood that a greater or lesser number per rotation may be generated.

While I have shown stationary and movable contacts 21 to 25 for purposes of illustration, any other commutating or pulse producing means may be used. For example, it may be preferable to avoid contact chatter to utilize two gas-discharge tubes. One of the tubes may be arranged to fire once per rotation of the motor $M_1$ for production of the pulses 21a and the other tube arranged to fire three times to produce the pulses 28.

The pulses produced by the motor $M_1$ are transmitted over transmission line 30 or any other suitable transmission system available to the location of the motor $M_2$. After transmission of the pulses, they are applied to a grid 31 of an amplifier stage $A_1$ whereby the pulses are amplified and transformed from negative to positive pulses as indicated at 33 Fig. 1 and curve $a$, Fig. 2. These pulses are applied to a grid 35 of second amplifier $A_2$. The amplifier $A_2$ is biased to provide a limiting action on the pulses 16. This limiting action reduces the amplitude of the pilot pulses to approximately the amplitude of the pulses 28. That is to say, the resulting energy conducted by the amplifier $A_2$ in response to the series of pulses 16 produces a new series of pulses 38 which are substantially of equal strength. These pulses 38 I use to control the operation of a known inverter 40.

The inverter 40 receives direct current from a rectifier 41 supplied with alternating current controlled by a master switch 42 and supplied through a transformer 43. The inverter comprises a first gas-discharge tube 51 and a second gas-discharge tube 52 connected in push-pull arrangement with a known trigger circuit 54 to which the series of pulses 38 is supplied. The trigger circuit 54 operates in response to the pulses to produce alternate pulsations on the anode circuits 55 and 56 which control the grids of the tubes 51 and 52. That is to say, the trigger circuit 54 divides the pulses 38 alternately between the tubes 51 and 52 causing the tubes to fire alternately. The anodes of the tubes 51 and 52 are connected together through the primary 57 of a transformer 58. Connected in parallel with the primary 57 is a commutating condenser 59. The source of direct current from the rectifier 41 is applied to a center tap 60 on the primary 57. The operation of the tubes 51 and 52 and the commutating condenser 59 provides an oscillation similar to the sine wave 62, curve c of Fig. 2. The oscillating energy of wave 62 is applied through the transformer 58 to the secondary circuit 63 and thence to the motor M₂ as a source of power. The circuit is arranged so that this source of alternating power will drive the motor M₂ at the speed of the motor M₁.

To insure synchronization of the motor M₂ in a predetermined angular phase relation with the motor M₁, the motor M₂ is provided with a movable contact 65 to operate in conjunction with a stationary contact 66 to produce a synchronizing pulse 67 for each rotation of the motor M₂. The energy for these pulses is supplied from a negative source C— and are of a duration and shape substantially as indicated at curve d, Fig. 2.

These synchronizing pulses 67 are compared with the pilot pulses 21a to determine whether the two motors are operating in a predetermined angular phase relation. This comparing operation is performed by a gas-discharge tube 70. The pilot pulse together with the pulses 28 are applied to a grid 71. The tube, however, is biased by the plate current of the amplifier A₂ through condenser circuit 72 connected to the cathode 73 and the cathode 78 so as to limit the operation of the tube 70 in response to the pilot pulses only. The negative synchronizing pulses 67 are also applied to the grid 71 in connection with a filtering circuit 75 whereby chattering effects produced by the contact 65 and 66 is substantially eliminated. Should the pilot pulse 21a be in exact synchronism with the synchronizing pulse 67, the latter will neutralize the pilot pulse sufficiently to prevent the tube 70 from firing. Should the synchronizing pulse be out of step with the pilot pulse 21a, the pilot pulse will then be free to cause the tube 70 to fire.

The cathode 73 of the tube 70 is connected to the cathode 78 of the amplifier A₂. When the tube 70 fires, a positive potential is applied to the cathode 78 thereby raising the negative bias on the amplifier tube so as to block the passage of current in response to the pulses 16 applied to the grid 35.

This control of the energy passed by the amplifier A₂ will be clear from an inspection of Fig. 2. The synchronizing pulses 67 of curve d are shown to be out of step initially with the pilot pulses 21a. The time constant of the self-biasing circuit 72 is such as to maintain the increased negative bias on the amplifier A₂ for the duration of any desired number of pulses 16. For purposes of illustration, I have shown by curve b a blocking period equal to a duration of approximately four pulses.

Blocking of the pulses by operation of the tube 70 cuts off temporarily the application of power to the motor M₂. This is indicated by the alternating current wave 62 of curve c which decreases to zero at 81 during the blocking of the pulses. The blocking period is also indicated by the duration of the negative bias 82 (curve e) imposed upon the amplifier A₂ by the firing of the tube 70. As the negative bias 82 is reduced on the amplifier A₂, the passage of energy in accordance with the pulses 16 resumes operation on the inverter thereby resuming the generation of the alternating current wave 62 as indicated at 62a.

Assuming that the rotation of the motor M₂ has decreased sufficiently to drop back in phase with respect to the motor M₁ one quarter turn, the synchronizing pulses 67 will still be out of step with the pilot pulses 21a as indicated at 83. The self-bias of the circuit 72 on the tube 70, however, may be such as to delay the operation of the tube in response to the pilot pulses for a short interval which of course may be determined by the value of the resistance-capacitance ratio of the circuit 72. For purposes of illustration, the tube 70 is shown in the graph of Fig. 2 to operate in response to the second pilot pulse occurring after resumption of power on the motor M₂. Thus, a second blocking period 84 is shown to occur in response to the second occurring pilot pulse after resumption of power 62a, thereby decreasing the power of the motor M₂ and retarding the occurrence of the synchronizing pulses 67 another quarter turn of the motor. This retardation brings the motor M₂ in the predetermined angular phase relation with the motor M₁ as indicated at 85.

As a precaution against the possibility of the gas-discharge tubes 51 and 52 from being locked together in simultaneous discharge and thereby burn out the rectifier 41, I provide a safety control which de-energizes the system should such locking operation occur. This locking operation might occur should an extraneous pulse be received close to one of the pulses 16 thereby causing one of the tubes 51 or 52 to fire almost simultaneously with the firing of the other tube. Should the two tubes be thus locked in simultaneous discharge, the flow of current through the two sides of the primary 57 will be in opposite directions thereby resulting in no current flow in the secondary circuit 63. This lack of flow in the secondary of the transformer is used to de-energize the system. One of the leads to the transformer 43 is provided with a relay contact 86 controlled by a relay coil 87 placed in the anode circuit of a vacuum tube 88. The grid 89 is provided normally with a negative bias through a resistor 90. To insure conduction of the tube 88 and thereby energize the relay 87 during normal operation, the negative bias on grid 89 is neutralized by a connection 92 to the secondary circuit 63 which is applied to a rectifier 93 which thereby supplies a positive potential to counter the negative bias supplied through the resistor 90. Thus, should the tubes 51 and 52 lock in discharge operation or for some other reason the transformer 58 fails to supply power, the relay 87 will become de-energized by the failure of positive voltage from the rectifier 93. The relay will then open the contact 86 breaking the circuit to the transformer 43 and thereby cut off the supply of direct current to the inverter 40.

De-energization of the relay 87 also operates to close a contact 96 thereby applying a negative bias over connection 97 to the grid 35 of the amplifier A₂. This application of a negative bias on the amplifier A₂ blocks further passage of energy therethrough thereby completely de-energizing the inverter circuit.

In order to start the system and bring the motor M₂ up to the speed of motor M₁ certain circuits must be closed. Besides closing the master switch 42, a switch S₁ controls a circuit arranged to provide a positive potential on the grid 89 in opposition to the negative potential through resistor 90. The closing of switch S₁ thus energizes the relay 85 which closes the relay contact 86 completing the primary circuit of the transformer 43 and opens relay contact 96 thereby removing the negative bias from the grid 35 of the amplifier $A_2$. A second switch $S_2$ is provided across the contacts 65 and 66 of the motor $M_2$ which when closed imposes a negative potential on the grid 71 of the tube 70 thereby neutralizing the blocking action of the pilot pulses $21a$. Thus, by momentarily holding in the switches $S_1$ and $S_2$, the system will be caused to operate and apply power to the motor $M_2$ thereby bringing the motor up to the speed of motor $M_1$. When the motor $M_2$ is thus brought up to speed and the switches $S_1$ and $S_2$ released, the system will automatically operate as hereinbefore described to bring the motor $M_2$ into the predetermined angular phase relation with motor $M_1$.

While I have described the principles of my invention in connection with a specific apparatus, I recognize that many modifications and variations may be made without departing from the invention. For example, the trigger circuit 54 and the inverter 40 may be replaced by a single tube inverter. That would result in a simpler circuit but one less efficient. It is to be understood, therefore, that the embodiment herein shown and described is given by way of example only and not as limiting the scope of the invention as set forth in the objects thereof and the appended claims.

I claim:

1. A system for synchronizing in a predetermined angular phase relation the rotation of first and second devices, comprising means to generate pulse energy according to the rotation of said first device, means to drive said second device at the speed of said first device, means to generate synchronizing pulses according to the rotation of said second device, means to control said driving means, including means for comparing said pulses with said pulse energy so that should said second device be out of predetermined angular phase synchronism with said first device, said control means will cause said driving means to vary the speed of the second device relative to said first device.

2. The system defined in claim 1, wherein the means for generating the pulse energy includes the generation of a pilot pulse per rotation of said first device, and the means for generating said synchronizing pulses is arranged to produce one such pulse per rotation of said second device, the two devices being in said predetermined angular phase synchronism when the pilot pulses coincide with said synchronizing pulses.

3. The system defined in claim 1, wherein the driving means comprises a source of direct current and inverter means operated by said pulse energy to invert the direct current to alternating current as driving energy for sad second device, and said control means is arranged to control the application of said pulse energy to said inverter means according to the synchronism of said pulses with said pulse energy.

4. The system defined in claim 1, wherein the control means includes an amplifier, and the comparison means comprises a biasing control for the amplifier, said biasing control being inoperative to affect normal operation of said amplifier when the first and second devices are operating in predetermined angular phase relation and to impose a negative bias on said amplifier when said second device is out of angular phase relation with said first device.

5. The system defined in claim 1, wherein the driving means includes two gas-discharge devices adapted to operate alternately in response to pulses of said pulse energy, together with means to de-energize the system should said gas-discharge devices be caused to lock together for simultaneous discharge.

6. The system for synchronizing in a predetermined angular phase relation the rotation of first and second devices, comprising means to generate a series of pulses per rotation of said first device, one of the pulses of said series being of greater amplitude than the others, thereby constituting a pilot pulse, means to drive said second devices at the speed of said first device, means to generate a synchronizing pulse per rotation of said second device, and means to control the operation of said driving means by controlling application thereto of said series of pulses, said controlling means including means to compare the pilot pulses and the synchronizing pulses for maintaining said predetermined phase relationship, said comparing means operating whenever said synchronizing pulse is out of step with said pilot pulse to block said pulse series thereby retarding said driving means.

7. The system defined in claim 6, wherein said comparing means is arranged to make periodic comparison of the pilot and synchronizing pulses and each time a synchronizing pulse is detected out of step with the pilot pulse said control means is caused to block momentarily the application of said pulse series, thereby retarding slightly the speed of said second device.

8. The system defined in claim 6, wherein the control means comprises an amplifier arranged to control the application of said pulse series to said driving means, and the comparison means comprises a biasing control for the amplifier, said biasing control being inoperative to affect normally the operation of said amplifier when the first and second devices are in said predetermined angular phase relation and to apply a negative bias on said amplifier when a synchronizing pulse drops out of step with said pilot pulse.

9. The system defined in claim 6, wherein said control means includes an amplifier to control the application of said pulse series to said driving means, and the comparison means comprises a gas-discharge tube operable to fire in response to said pilot pulse when said synchronizing pulse is out of step therewith, said gas-discharge tube having the cathode thereof connected to the cathode of said amplifier so that the firing of the gas-discharge tube imposes a negative bias on the amplifier thereof blocking momentarily the application of the pulse series by said amplifier.

10. The system defined in claim 6, wherein the driving means comprises a source of direct current, means including a pair of gas-discharge tubes for inverting the direct current to alternating current as a driving energy, and a trigger circuit for applying the pulses of said series alternately to said gas-discharge tubes.

11. The system defined in claim 6, wherein the driving means comprises a source of direct current, means including a pair of gas-discharge tubes for inverting the direct current to alternating current as a driving energy, a trigger circuit for applying the pulses of said series alternately to said gas-discharge tubes, and means to de-energize the system should said gas-discharge devices be caused to lock for simultaneous discharge.

12. The system defined in claim 6, wherein said comparing means is arranged to operate each time a synchronizing pulse drops out of step with the pilot pulse to block momentarily the application of said pulse series, thereby slightly retarding the speed of said driving device, and said system includes means operative in response to a blocking operation longer than a predetermined interval to deenergize the system.

13. In a system of the character described, a source of pilot pulses and synchronizing pulses, an amplifier operable normally to pass energy in accordance with the pilot pulses, and pulse comparing means operable when a synchronizing pulse is out of step with a pilot pulse to momentarily impose a negative bias upon the amplifier, thereby blocking momentarily the passage of energy through said amplifier.

14. The system defined in claim 13, wherein the comparison means comprises a gas-discharge device operable to conduct current in response to the pilot pulse only when the synchronizing pulses are out of step with the pilot pulses, and means to connect said gas-discharge device to said amplifier so as to impose thereon a negative bias upon conduction of current by said device.

LOUIS A. DE ROSA.

REFERENCES CITED

The following references are of record in the file of this patent:

UNITED STATES PATENTS

| Number | Name | Date |
| --- | --- | --- |
| 2,322,985 | Wegener | June 29, 1943 |